United States Patent Office 3,265,301
Patented August 9, 1966

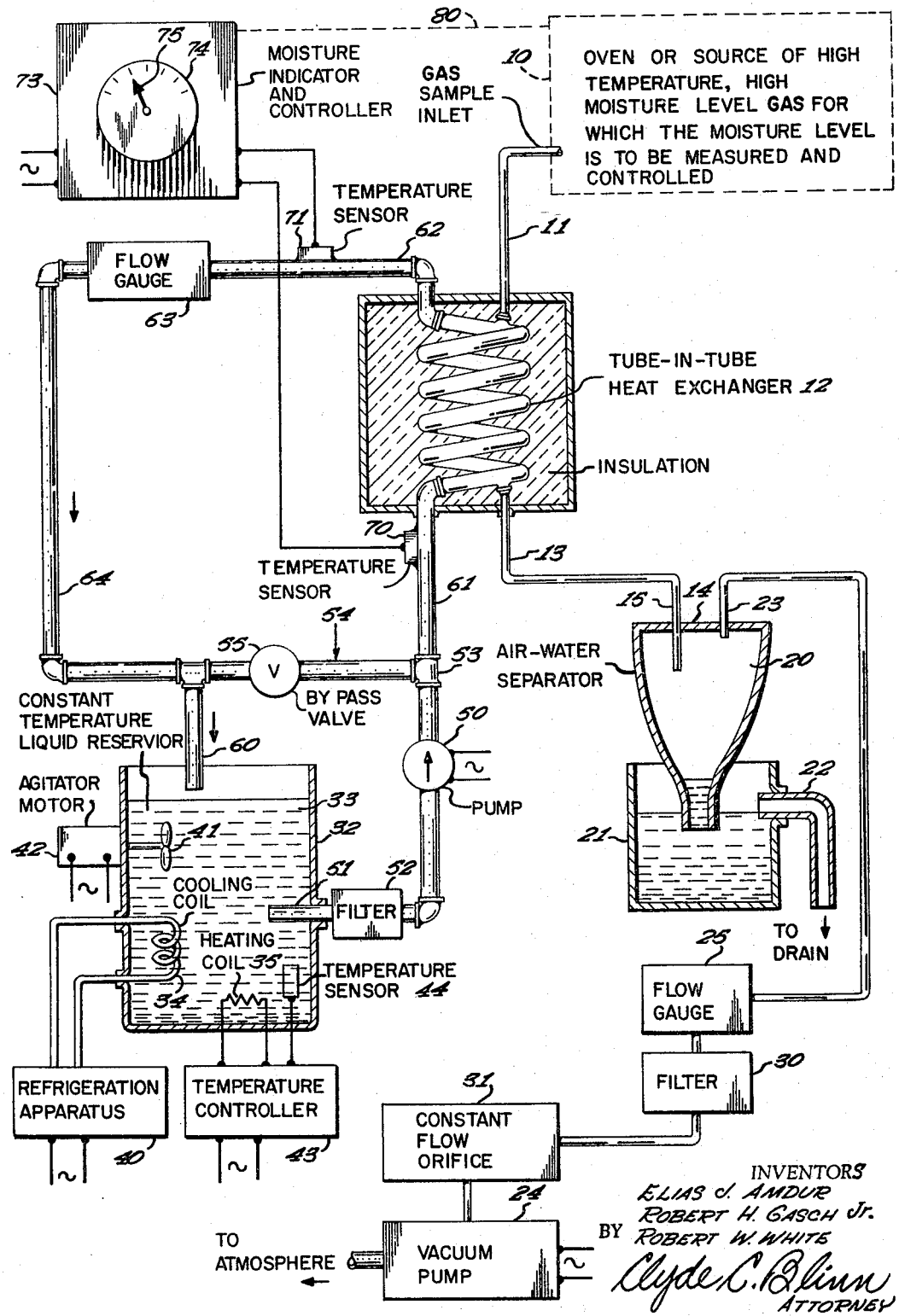

3,265,301
ABSOLUTE HUMIDITY CONTROL AND
INDICATION APPARATUS
Elias J. Amdur, St. Louis Park, Robert H. Gasch, Jr., Long Lake, and Robert W. White, Glen Lake, Minn., assignors to Honeywell Inc., a corporation of Delaware
Filed July 2, 1963, Ser. No. 292,317
5 Claims. (Cl. 236—44)

The present invention is concerned with an absolute humidity sensing system; in particular, a continuous sample of air from a high temperature-high moisture level space is cooled to condense the moisture in the air and the amount of heat removed to condense the moisture provides a continuous indication of the amount of moisture in a predetermined amount of air.

Heretofore, the determination of the amount of moisture in high temperature air or the absolute humidity of air above 212° Fahrenheit has been done by measuring the amount of moisture which is condensed from a predetermined sample of air. In such systems, an operator is needed to measure the quantity of water removed and by means of some chart or table the absolute humidity could be determined if the quantity of air from which the water sample was taken was known.

With the advent of automatic control and the use of labor saving devices, a need developed for a continuous reading absolute humidity system. In the present invention, a continuous predetermined sample of air is taken from the high temperature air source. By means of a heat exchanger, the moisture in the air sample is condensed and the quantity of heat removed from the moisture to reduce the moisture to a liquid form is indicative of the absolute humidity.

An object of the present invention is to provide an improved continuous reading absolute humidity sensing system;

Another object of the present invention is to provide an absolute humidity system wherein a predetermined continuous sample of air is removed from a source of high temperature-high moisture level air source and by measuring the heat removed to condense the moisture, a signal indicative of the absolute humidity is continually provided.

These and other objects of the present invention will become apparent upon the study of the following specification and drawing, of which A single figure is a schematic representation of the absolute humidity indication and control system.

Referring to the single figure, a source 10 of high temperature gas or air of which the moisture level is to be determined might be a baking oven, a drying oven, a kiln, or a food processing space. By means of a pipe or sampling inlet 11 air can flow into one passageway or container of a conventional heat exchanger which might be a tube-in-tube heat exchanger wherein two tubes are connected in thermal relationship so that the fluids passing through the separate tubes will not mix. An outlet 13 which is connected to the same passageway as inlet 11 directs the air and water into a conventional air-water separator 14. As the water drips from pipe 15 into the chamber 20, the water flows into tank 21 to be drained off through a drain 22. By means of the water level in tank 21, a water seal is provided to prevent the air from entering except through the pipe 15 which is connected to a conventional vacuum pump pumping the air to the atmosphere through a series connection comprising, a conventional flow gauge 25 for measuring the flow of air, a filter 30 for filtering any foreign particles from the air, a constant flow control or flow orifice 31 such as a brass disc with a 0.040 inch hole for maintaining the flow of air from the separator 14 at a predetermined constant flow, and to the vacuum pump 24.

The heat is removed from the air and moisture sample in the heat exchanger 12 to condense the moisture by supplying a cold medium or fluid to the heat exchanger from a source of cold fluid contained in a tank 32. Cold fluid 33 is maintained at a predetermined low temperature such as 36° Fahrenheit by a source of cooling or cooling coil 34 and a source of heating or heating element 35. The cooling coil 34 is connected to a conventional refrigeration apparatus 40 of the type shown in the Alwin B. Newton Patent No. 2,214,700 to constantly cool the fluid 33 upon being agitated or circulated in tank 32 by an impeller 41 driven by a constantly energized agitator motor 42. Heater 35 is energized by a conventional temperature controller 43 in response to the temperature as sensed by a temperature sensor or bulb 44 contained in the fluid 33 of tank 32. Temperature controller 43 is of a conventional type for providing for the energization of heating coil 35 whenever the temperature of bulb 44 drops below a predetermined control point setting such as 36° Fahrenheit to heat the fluid to overcome the cooling which is accomplished by the predetermined mentioned coil 34.

The fluid from tank 32 is circulated by a pump 50 through two parallel paths which may be insulated to reduce heat gain. A first path is from the outlet pipe 51 of tank 32, a conventional filter 52, a constantly energized pump 50, a conduit or pipe T 53, a bypass line 54 containing an adjustable bypass valve 55, and back to an inlet 60 of tank 32. Connected in parallel with the bypass line 54 is the second passageway or chamber of the tube-in-tube heat exchanger 12 having an inlet 61 and an outlet 62. Inlet 61 is connected to T 53 and outlet 62 is connected through a conventional flow gauge 63 for measuring the flow of fluid through the heat exchanger and back to the inlet 60 through a pipe 64. By the adjustment of bypass valve 55 with a predetermined flow as established by the constantly energized pump 50, the flow of 36° Fahrenheit fluid through heat exchanger 12 can be adjusted to a predetermined amount as measured by flow gauge 63.

In order to measure the amount of heat added to the fluid as it flows through the heat exchanger 12, an inlet temperature sensor 70 and an outlet temperature sensor 71 are mounted on the inlet 61 and outlet 62 of the heat exchanger. Sensors 70 and 71 are connected to a conventional differential temperature indicator and controller 73, which has a scale plate 74 and meter needle or indicator 75. A typical differential temperature controller contains a bridge circuit having two temperature responsive resistance elements connected thereto. The output of the bridge circuit is used to energize a meter or indicator and to control electrical relays in response to a predetermined temperature difference between the two elements. By means of a conventional connection 80, the output of controller 73 is adapted to readjust a condition changing apparatus to control the moisture level in source 10.

Operation

Assuming that the various sources of energy for the components of the apparatus shown in the single figure are energized, the operation of the absolute humidity sensing system is as follows. With the supply of cold fluid 33 at 36° Fahrenheit, and the position of the bypass valve 55 set to maintain some predetermined flow through the heat exchanger from inlet 61 to outlet 62, a measure of the temperature difference between temperature bulb 70 and 71 provides a signal indicative of the amount of heat taken from the heat exchanger 12. The amount of heat removed from the sample to condense the moisture to water and lower the temperature of both the air and water is proportional to absolute humidity.

With the vacuum pump 24 energized, a constant flow of gas comprising air and water vapor from outlet 13 flowing to separator 14, flow gauge 25 and filter 30 is provided by the constant flow orifice 31. The gas contains a fixed ratio of water vapor and air since the gas leaving outlet 13 is saturated at a constant temperature of 36° Fahrenheit. Since the amount of water vapor and air leaving the separator through the vacuum pump is known and constant, controller 73 can be calibrated to compensate for this amount. Since the water separator 14 removes the water from the air, the flow orifice 31 only meters gas flow. By the proper calibration, a predetermined flow as measured by the flow gauge 25 can be maintained.

As the air sample enters inlet tube 11 from the source 10, the high temperature air containing moisture passes into the heat exchanger to be reduced in temperature to 36° Fahrenheit. The reduction in temperature results in a condensation of some moisture in the air so that air, water vapor, and water leaves the heat exchanger through outlet 13 to enter the separator 14.

Since the flow of air into the heat exchanger is of a constant value, the amount of heat needed to condense the moisture from the air is indicative of the amount of moisture in a predetermined quantity of air. By recalibrating the scale 74 of indicator 73, the scale can provide a direct reading of absolute humidity in various forms such as the dew point in degrees Fahrenheit, the vapor pressure in inches of mercury, and the saturation humidity in pounds of water per pound of dry air or other ways of expressing absolute humidity. Since the flow of air into the heat exchanger from source 10 and the flow of chilled fluid to the heat exchanger for removing the heat are constant, the signal available from the temperature differential sensors is indicative of absolute humidity. The calibration of controller 73 is accomplished by drawing gas samples of known dew point and dry bulb temperatures into inlet 11. For example, gas at 220° Fahrenheit dry bulb temperature at a dew point temperature varying over a predetermined range such as 150 to 200° Fahrenheit would produce a calibration of indicator 74–75 to read directly in dew point temperature.

During the operation of the apparatus, a field check of the moisture indicator or controller 73 can be readily made by measuring the quantity of water from tube 22 for a predetermined time period. By knowing the flow of air through the sample inlet as determined from the flow gauge reading, the absolute humidity in pounds of water per pound of dry air can be readily calculated.

The moisture indicator controller 73 not only indicates the absolute humidity as shown by the scale 74, but controller 73 is connected by connecting 80 to associated equipment for controlling various condition changing apparatus to readjust the moisture level of source 10 in a manner obvious to one skilled in the art.

While the invention has been described in one particular embodiment, the intent of the applicants is to limit the scope of the present invention by the scope of the appended claims, in which we claim:

1. In an absolute humidity indication system for measuring the quantity of moisture in a predetermined quantity of gas from a high temperature gas source,
a heat exchanger having a first passageway with an inlet and an outlet,
a source of heat transfer fluid maintained at a temperature of at least 36° Fahrenheit,
a constantly energized pump,
conduit means connecting said source, said pump and said inlet and outlet in a series whereby cold fluid is circulated at a constant rate through said first passageway to remove heat from said heat exchanger,
a differential temperature measuring means having a first temperature sensor mounted on said inlet and a second temperature sensor mounted on said outlet, said measuring means having an indicating meter with a hand positioned in response to the temperature difference between the inlet fluid and outlet fluid to said heat exchanger, said heat exchanger having a second separate passageway connected in thermal relation to said first passageway whereby heat lost by said second passageway is gained by said first passageway, said second passageway having an inlet and an outlet,
conduit means adapted to connect said inlet of said second passageway to continually sample high temperature gas from the source,
a gas and water separator means,
a constant gas flow control means,
a flow gauge,
a vacuum pump,
and conduit means connecting said outlet of said second passageway, said separator means, said flow gauge, said constant flow control means, and said vacuum pump in series whereby moist gas is drawn into said inlet of said second passageway, cooled, and after a predetermined amount of the water is separated, the gas is pumped to the atmosphere by said vacuum pump, said indicating meter being calibrated to indicate absolute humidity.

2. In an absolute humidity control system for controlling the quantity of moisture in the air of a high temperature gas source,
a heat exchanger having a first passageway with an inlet and an outlet,
a source of cooling medium,
conduit means connecting said source to said inlet and outlet in a series whereby said medium is circulated at a constant rate through said first passageway to remove heat from said heat exchanger,
a differential temperature sensing means having a first temperature sensor mounted on said inlet and a second temperature sensor mounted on said outlet, said sensing means having an output indicative of the temperature difference between the inlet medium and outlet medium to said heat exchanger, said heat exchanger having a second passageway having an inlet and an outlet and connected in thermal relation to said first passageway,
conduit means adapted to connect said inlet of said second passageway to continually sample high temperature-high moisture level gas from the source,
an air and water separator means,
a constant air flow control means,
a vacuum pump,
conduit means connecting said outlet of said second passageway, said separator means, said constant flow control means, and said vacuum pump in series whereby moist air is drawn into said inlet of said second passageway, cooled, the moisture condensed, and after a predetermined quantity of the water is separated the air is pumped to the atmosphere by said vacuum pump,
control means adapted to change the moisture level in the air of said gas source,
and means connecting said output to said control means.

3. In apparatus for continuously determining the quantity of moisture in a continuous sample of high temperature gas containing air and water vapor, a heat exchanger having a chamber for cooling the gas to condense a quantity of the water vapor contained in the gas and reduce the temperature of the gas, means for removing heat from said chamber comprising the circulation of cooling medium entering said chamber at a predetermined temperature and at a predetermined rate, an indicator means having at least one temperature responsive means responsive to the temperature of said medium leaving said means for removing heat for providing an indication indicative of the heat removed from said chamber, a pump means for pumping a constant flow of gas, separator means for separating water from gas, conduit means including said separator means for connecting said pump means to said chamber, a sampling inlet connected to said chamber adapted to receive high temperature gas whereby upon said gas entering said chamber said indicator means continuously provides an indication indicative of the quantity of moisture in said gas passing through said chamber.

4. In apparatus for responding to the quantity of moisture in a predetermined quantity of high temperature air containing water vapor, a heat exchanger for cooling air to condense a portion of the moisture contained in the air, means for removing heat from said heat exchanger, indicator means for providing an indication indicative of the heat removed from said heat exchanger, means for pumping a constant flow of air, separator means for separating water from air, conduit means including said separator means for connecting said pump means to said heat exchanger, a sampling inlet connected to said heat exchanger adapted to receive high temperature-high moisture level air whereby upon said air entering said heat exchanger said indicator means continuously provides an indication indicative of the quantity of moisture in a predetermined quantity of air passing through said heat exchanger.

5. In apparatus for continuously responding to the quantity of moisture in a predetermined quantity of gas, means for continuously sampling a controlled flow of gas from a source of moist gas, cooling means to remove a quantity of heat for cooling said gas to condense a portion of the moisture therefrom and reduce the temperature of said gas, and means responsive to said quantity of heat removed for providing an indication indicative of the quantity of moisture in a predetermined volume of gas.

References Cited by the Examiner
UNITED STATES PATENTS

| | | | |
|---|---|---|---|
| 2,506,806 | 5/1950 | Metzger | 73—336 |
| 3,021,427 | 2/1962 | Bayly et al. | 73—29 |
| 3,200,636 | 8/1965 | Flumerfelt | 73—29 |

RICHARD C. QUEISSER, *Primary Examiner.*

J. FISHER, *Assistant Examiner.*